(12) United States Patent
Damji et al.

(10) Patent No.: US 9,356,808 B2
(45) Date of Patent: May 31, 2016

(54) SYSTEM AND METHOD FOR ADAPTIVE CHANNEL ESTIMATION BASED ON DATA ACTIVITY

(71) Applicant: APPLE INC., Cupertino, CA (US)

(72) Inventors: Navid Damji, Cupertino, CA (US);
Tarik Tabet, Cupertino, CA (US);
Johnson Sebeni, Cupertino, CA (US);
Syed Aon Mujtaba, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 68 days.

(21) Appl. No.: 14/496,969

(22) Filed: Sep. 25, 2014

(65) Prior Publication Data
US 2015/0085688 A1    Mar. 26, 2015

Related U.S. Application Data

(60) Provisional application No. 61/882,352, filed on Sep. 25, 2013.

(51) Int. Cl.
*H04W 52/02* (2009.01)
*H04L 5/00* (2006.01)
*H04L 25/02* (2006.01)

(52) U.S. Cl.
CPC ....... *H04L 25/0228* (2013.01); *H04W 52/0229* (2013.01); *H04W 52/0245* (2013.01); *H04L 5/0023* (2013.01); *H04L 5/0048* (2013.01)

(58) Field of Classification Search
CPC . H04L 25/0228; H04L 5/0023; H04L 5/0048; H04W 52/0229; H04W 52/0245
See application file for complete search history.

(56) References Cited

U.S. PATENT DOCUMENTS

| | | | |
|---|---|---|---|
| 2010/0317343 A1* | 12/2010 | Krishnamurthy | G01S 1/30 455/435.1 |
| 2012/0327896 A1* | 12/2012 | Lee | H04W 72/044 370/330 |

* cited by examiner

*Primary Examiner* — Jianye Wu
(74) *Attorney, Agent, or Firm* — Fay Kaplun & Marcin, LLP

(57) ABSTRACT

A station performing a method to toggle a channel estimation setting between a full channel estimation that includes estimating the channel based upon a predetermined number of received reference symbols prior to a current subframe and a partial channel estimation that includes estimating the channel based upon a subset of the predetermined number of received reference symbols. The method includes changing the setting from full to partial when a predetermined number of consecutive subframes immediately prior to the current subframe had no downlink allocated and a reliability value indicates that control signals are capable of being reliably received. The method also includes changing the setting from partial to full when the current subframe had a downlink allocated thereto or the reliability value indicates that the control signals are incapable of being received to estimate the channel using the partial channel estimation.

20 Claims, 5 Drawing Sheets

SYSTEM AND METHOD FOR ADAPTIVE CHANNEL ESTIMATION BASED ON DATA ACTIVITY

PRIORITY CLAIM/INCORPORATION BY REFERENCE

This application claims priority to U.S. Provisional Application 61/882,352 entitled "System and Method for Adaptive Channel Estimation Based on Data Activity," filed on Sep. 25, 2013, the entirety of which is incorporated herein by reference.

BACKGROUND INFORMATION

A station may establish a wireless connection to a wireless communications network using a variety of different hardware and software. During the connection with the network, the station may be required to calculate a variety of wireless properties. For example, the station may use at least one reference symbol that is received to estimate a channel.

SUMMARY

In one exemplary embodiment described below, a method is performed by a station. The method includes determining a setting to perform a channel estimation, the setting being one of a full channel estimation and a partial channel estimation, the full channel estimation including estimating the channel based upon a predetermined number of received reference symbols prior to a current subframe, the partial channel estimation including estimating the channel based upon a subset of the predetermined number of received reference symbols. The method further includes changing the setting from the full channel estimation to the partial channel estimation when a predetermined number of consecutive subframes immediately prior to the current subframe had no downlink allocated thereto and a reliability value indicates that control signals are capable of being received to estimate the channel using the partial channel estimation and changing the setting from the partial channel estimation to the full channel estimation when one of the current subframe had a downlink allocated thereto or the reliability value indicates that the control signals are incapable of being received to estimate the channel using the partial channel estimation.

In a further exemplary embodiment described below, a station includes a transceiver and a processor coupled to a memory. The transceiver is configured to establish a connection to a network and is further configured to receive reference symbols from the network. The processor is programmed to determine a channel estimation setting to perform a channel estimation, the setting being one of a full channel estimation and a partial channel estimation, the full channel estimation including estimating the channel based upon a predetermined number of received reference symbols prior to a current subframe, the partial channel estimation including estimating the channel based upon a subset of the predetermined number of received reference symbols. The processor determines the channel estimation setting by being programmed to determine a current channel estimation setting for the station, determine, when the current channel estimation setting is a full channel estimation setting, whether a downlink has been allocated for a predetermined number of subframes prior to a current subframe, calculate a reliability value for a channel for which channel estimation is to be performed and change the current channel estimation setting to a partial channel estimation setting when no downlink has been allocated for the predetermined number of subframes prior to the current subframe or the reliability value meets a predetermined criteria.

In another exemplary embodiment described below, a method is performed by a station. The method includes determining a channel estimation setting for the station, determining, when the channel estimation setting is a full channel estimation setting, whether a downlink has been allocated for a predetermined number of subframes prior to a current subframe, wherein a full channel estimation includes estimating the channel based upon a predetermined number of received reference symbols prior to the current subframe, calculating a reliability value for a channel for which channel estimation is to be performed and changing the channel estimation setting to a partial channel estimation setting when no downlink has been allocated for the predetermined number of subframes prior to the current subframe or the reliability value meets a predetermined criteria, wherein partial channel estimation includes estimating the channel based upon a subset of the predetermined number of received reference symbols.

DETAILED DESCRIPTION

Figure 1:
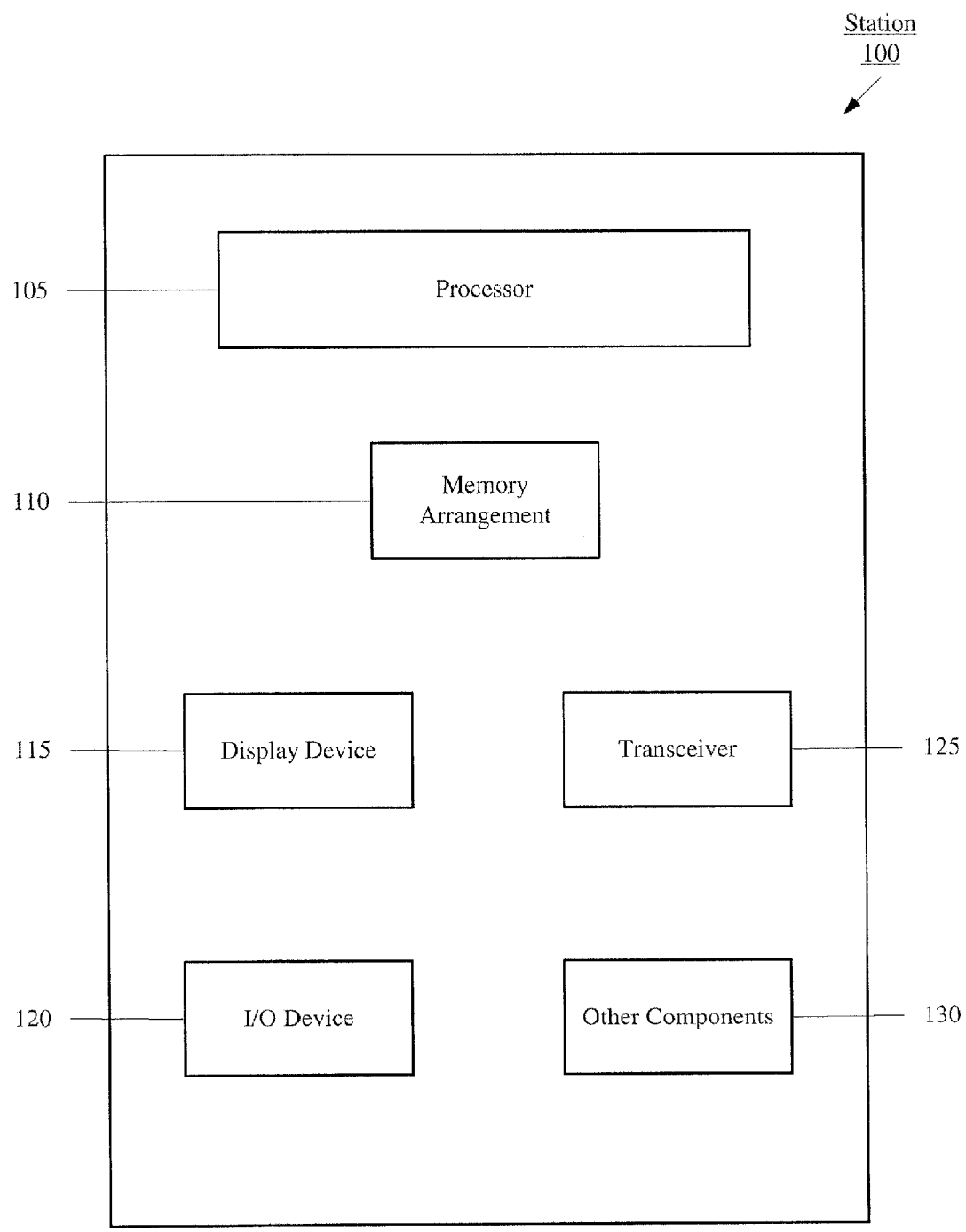
FIG. 1 shows an exemplary station configured to perform a channel estimation while executing an application.

The exemplary embodiments may be further understood with reference to the following description and the related appended drawings, wherein like elements are provided with the same reference numerals. The exemplary embodiments are related to a system and method for adaptive channel estimation based upon data activity. Specifically, a station that has established a connection to a network to execute an application that utilizes the wireless connection may set a manner of estimating the channel based upon prior subframe activity relative to a current subframe as well as a reliability index. The station, the channel estimation, the current and prior subframes, the types of settings, and a related method will be described in further detail below.

A station may establish a connection to a wireless communications network via a base station (e.g., an eNodeB in LTE networks). While connected to the network, the station may execute an application in which a transmission is downlinked and/or uplinked to the network. To properly be prepared for demodulating transmitted signals (i.e., received signals), the station must be configured with proper settings. Specifically, properties related to the physical layer of the transceiver used to connect to the network must be known. For example, the channel (e.g., band of frequencies) must be known for the incoming signal in order for it to be properly received. While connected to the network, reference symbols are transmitted from a base station of the network to the station. The reference symbols are used as a basis for calculating a variety of wireless properties, for example, channel estimation.

The downlink receiver performance critically depends on an accuracy of the channel estimation. The accuracy of the channel estimation depends on the number of reference symbols that are processed within and across sub-frame boundaries. The performance impact also depends on which type of downlink channel is being decoded and which reference symbols (relative to time) are relevant and its corresponding accuracy. For example, the downlink control channel such as Physical Downlink Control Channel (PDCCH) is transmitted in select ones of orthogonal frequency-division multiplexing (OFDM) symbols of a subframe. The reference symbols received in a subset of these select ones have more importance than others. In another example, the downlink shared channel such as Physical Downlink Shared Channel (PDSCH) is transmitted in remaining ones of the OFDM symbols of a subframe. The reference symbols received in the select ones of the OFDM symbols of the subframe have equal importance.

To have good downlink receiver performance, not only are the relevant reference symbols important, there may also be some filtering performed using one or more adjacent reference symbols based on several parameters such as Doppler, signal-to-noise ratio, etc. This may lead to the use of reference symbols from previously transmitted subframes. In a specific example, with only PDCCH being decoded (i.e., no PDSCH) and it being determined that there is no downlink grant for the station, the hardware/software processing associated with channel estimation and other loops may be deactivated to conserve power that would otherwise be associated with such processing.

Throughout this description, the exemplary embodiments will be described with reference to an LTE communication network. However, it will be understood by those skilled in the art that the exemplary embodiments may be applicable to other types of wireless communications networks in accordance with the principles described herein. For example, it is not necessary that the wireless communication network include a base station that transmits reference symbols. The exemplary embodiments may be applied to any wireless communication network that includes a network component that transmits communications signals that are used by stations connected to the network for channel estimation.

FIG. 1 shows an exemplary station 100 configured to perform a channel estimation while executing an application. Specifically, the station 100 may exchange data with a base station of a wireless network and receive reference symbols therefrom. The station 100 may have a setting that indicates the manner in which the channel estimation is performed. The station 100 may represent any electronic device that is configured to perform wireless functionalities. For example, the station 100 may be a portable device such as a phone, a smartphone, a tablet, a phablet, a laptop, etc. In another example, the station 100 may be a stationary device such as a desktop terminal. The station 100 may include a processor 105, a memory arrangement 110, a display device 115, an input/output (I/O) device 120, a transceiver 125, and other components 130. The other components 130 may include, for example, an audio input device, an audio output device, a battery, a data acquisition device, ports to electrically connect the station 100 to other electronic devices, etc.

The processor 105 may be configured to execute a plurality of applications of the station 100. For example, the applications may include a web browser when connected to a communication network via the transceiver 125. In another example, the applications may include a video viewer in which a video file is streamed from the network, a voice over Long Term Evolution (VoLTE), etc. In a specific embodiment, the processor 105 may execute a channel estimation application that may toggle a setting to also perform the channel estimation. The channel estimation application may be executed in a background relative to the user and may also be automatically executed upon a connection with the network. The memory 110 may be a hardware component configured to store data related to operations performed by the station 100. Specifically, the memory 110 may store the reference symbols that are received. The display device 115 may be a hardware component configured to show data to a user while the I/O device 120 may be a hardware component that enables the user to enter inputs. It should be noted that the display device 115 and the I/O device 120 may be separate components or integrated together such as a touchscreen.

The transceiver 125 may be a hardware component configured to transmit and/or receive data. That is, the transceiver 125 may enable communication with other electronic devices directly or indirectly through a network based upon an operating frequency of the network. The transceiver 125 may operate on a variety of different frequencies or channels (e.g., set of consecutive frequencies). Thus, an antenna (not shown) coupled with the transceiver 125 may enable the transceiver 125 to operate on the various frequencies. The transceiver 125 may be used for transmissions that are received from the base station (e.g., reference symbols) and sent from the station. It is noted that throughout this description the term "transmission" and its variants may refer to either an uplink transmission (e.g., a signal sent from the station to the base station) or a downlink transmission (e.g., a signal sent from the base station to the station).

It should be noted that the exemplary channel estimation application does not need to be executed by the processor 105. In another example, the functionality that is described herein for the channel estimation application may be performed by the transceiver 125 executing firmware stored on an integrated circuit of the transceiver 125. In a further example, the functionality of the channel estimation application may be performed by a separate integrated circuit with or without firmware.

Figure 2A:
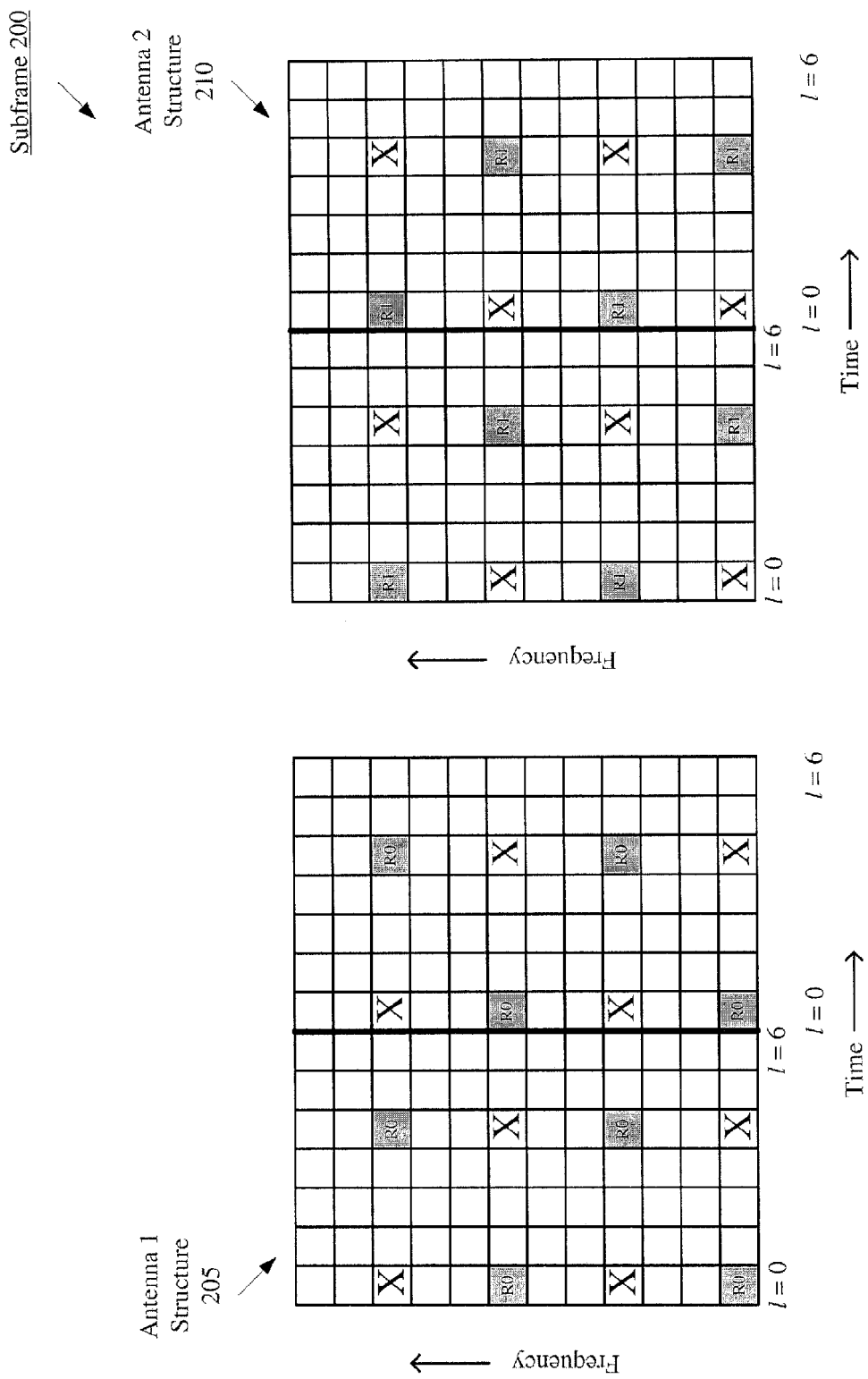
FIG. 2A shows an exemplary subframe of a traffic activity while executing the application.

FIG. 2A shows an exemplary subframe 200 of a traffic activity while executing an application. The subframe 200 may represent any subframe of a frame during the execution of the application that utilizes the wireless connection to the network. Specifically, the subframe 200 may be for the reference symbols being received by the station 100. Those skilled in the art will understand that the frame may have a duration of 10 ms in which a plurality of equal duration subframes may comprise the frame. For example, each subframe may be 1 millisecond (ms) in duration. The subframe 200 illustrated in FIG. 2A relates to a wireless configuration of the station 100 in which two antennas are utilized. It should be noted that with two antennas, the station 100 may include a single transceiver 125 or may include a respective transceiver for each antenna. For example, the two antennas may be an antenna arrangement including a main antenna and a diversity antenna for a single transceiver. In another example, the two antennas may represent two antenna arrangements for two transceivers.

With two antennas, the subframe 200 may include a first antenna structure 205 and a second antenna structure 210. The antenna structures 205, 210 may indicate when a reference symbol is scheduled to be received within the duration of the subframe and the designated frequency at which the reference symbol is to be received at each antenna. Each of the subframes of the antenna structures 205, 210 may be divided into two slots, each slot having seven OFDM symbols. Accordingly, each slot has a frequency domain spacing of seven sub-carriers relative to time (i.e., subframe). There may be a frequency domain staggering of three sub-carriers between the first and second reference symbols in a slot. As illustrated, the reference symbols for the first antenna (as indicated in the first antenna structure 205) may be received within a plurality of predetermined OFDM symbols. Specifically, reference symbols are inserted within the first (l=0) and third to last (l=4) OFDM symbols relative to time at known frequencies. The same is also used for the second slot of the first antenna structure 205. Furthermore, since a second antenna is also present, the first antenna structure 205 has frequencies in the same OFDM symbols of the reference symbols that are blocked out. That is, the reference symbols for the first antenna structure 205 are prevented from transmitting the reference symbols at the blocked out frequencies. The second antenna structure 210 may also indicate where the reference symbols are inserted in a substantially similar manner as the first antenna structure 205. As illustrated, the reference symbols in the second antenna structure 210 are inserted at the blocked out frequencies and at the same time OFDM symbols of the first antenna structure 205. When viewed as a whole (both slots), the reference symbols in the first and second antenna structures 205, 210 are inserted at the zero-th, fourth, seventh, and eleventh OFDM symbols.

Figure 2B:
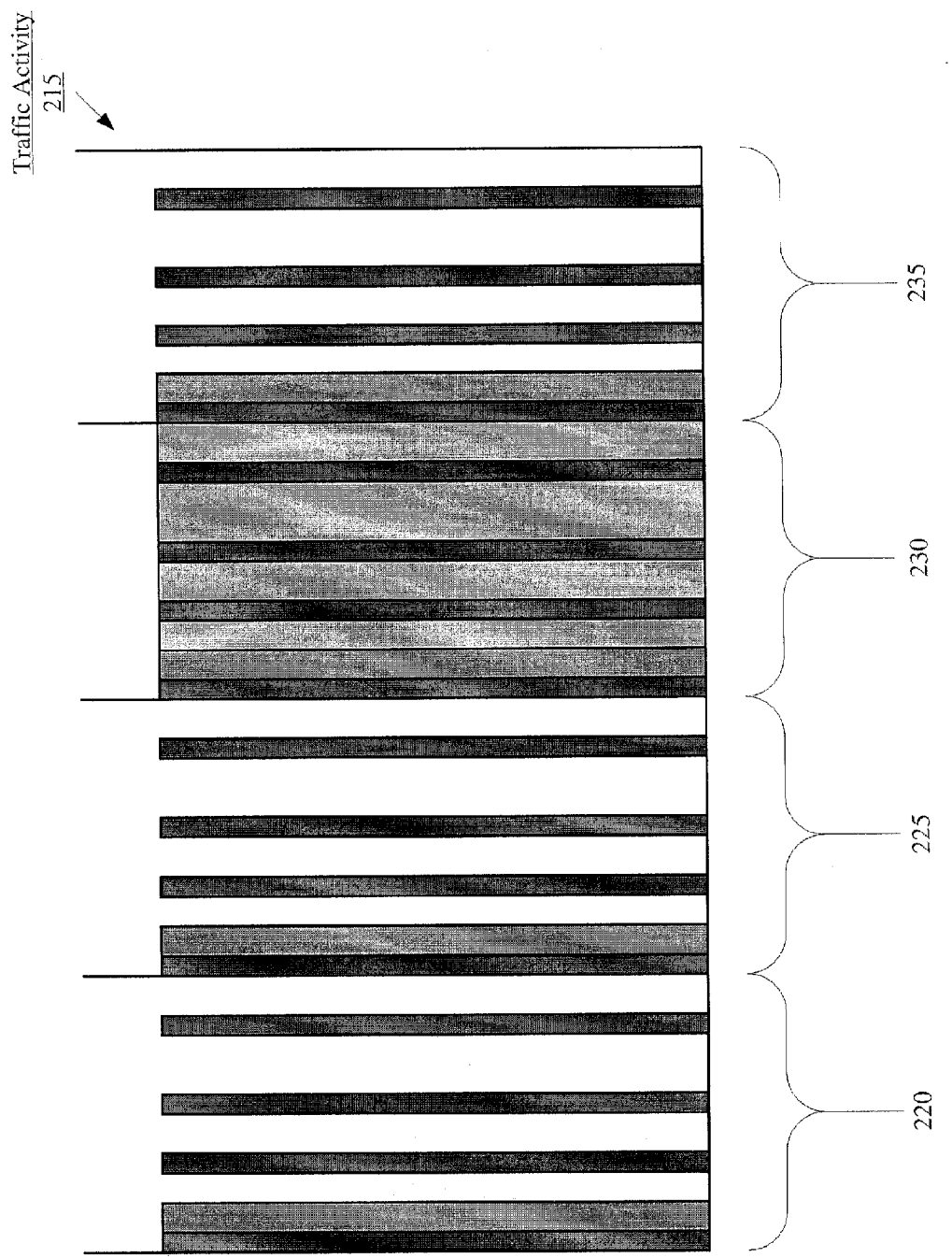
FIG. 2B shows an exemplary traffic activity from executing the application.

FIG. 2B shows an exemplary traffic activity 215 from executing the application. As illustrated, the traffic activity 215 relates to a period of four subframes 220, 225, 230, 235. Each subframe may indicate a duration of time (e.g., 1 ms) or a transmission time interval (TTI). As discussed above, each subframe 220-235 may have the reference symbol inserted at the zero-th, fourth, seventh, and eleventh OFDM symbols (represented as dark gray blocks). Immediately, after the reference symbol is received in the zero-th OFDM symbol in each subframe 220-235, the PDCCH signal transmission may be inserted for reception by the station 100 (represented as gray blocks). The subframes 220, 225, 235 also relate to when no PDSCH is inserted for reception by the station 100. In contrast, the subframe 230 relates to when the PDSCH is inserted for reception by the station 100 (represented as light gray blocks). Therefore, the traffic activity 215 shown in FIG. 2B includes a first subframe 220 in which only the PDCCH is received, a second subframe 225 in which only the PDCCH is received, a third subframe 230 in which the PDCCH and the PDSCH is received, and a fourth subframe 235 in which only the PDCCH is received.

The channel estimation may be performed using a variety of manners. The station 100 may utilize the different monitoring manners depending on, for example, two primary properties that may be considered: channel estimation accuracy and power consumption. When channel estimation accuracy is the property to be considered, the power consumption may increase, while when power consumption is the property to be considered, the channel estimation accuracy may decrease. For example, with channel estimation accuracy consideration, the station 100 may continuously process all the reference symbols in order to maximize the channel estimation accuracy. However, with the processor 105 being utilized in this manner, the amount of power consumption increases drastically. In another example, with power consumption consideration, the station 100 may only estimate the channel when the important reference symbols are received. As discussed above, with PDCCH, the select ones of the reference symbols that are of importance may be the ones received in the zero-th and fourth OFDM symbols. With PDSCH, all the reference symbols that are received may have equal importance. Accordingly, the channel estimation may be performed for the subframes 220, 225, 235 only from the zero-th OFDM symbol to the fourth OFDM symbol when the PDCCH is received. However, the channel estimation may be performed for the entirety of the frame 230. Since the channel estimation is not being performed from the fifth OFDM symbol to the thirteenth OFDM symbol of the subframes 220, 225, 235, the amount of power consumption may be decreased.

The deactivation of the hardware/software processing for channel estimation and other tasks when a PDSCH is not scheduled may save power. However, the performance of adjacent TTIs having a PDSCH allocated thereto may be impacted due to the lack of availability of the reference symbols prior to the PDSCH subframe. Specifically, the subframe 230 may experience this adverse effect as the channel estimation is performed only in the zero-th to the fourth OFDM symbols of the immediately prior subframe. Since the PDCCH of the current subframe indicates the PDSCH of the current subframe, the PDSCH allocation of the current subframe cannot be determined in the previous subframes. Accordingly, the power consumption manner described above for deactivating the channel estimation processing based on only the current PDCCH decoding may lead to an overall degradation of performance. The exemplary embodiments provide a manner of incorporating the activity pattern of the application being executed in order to address this issue.

Figure 2C:
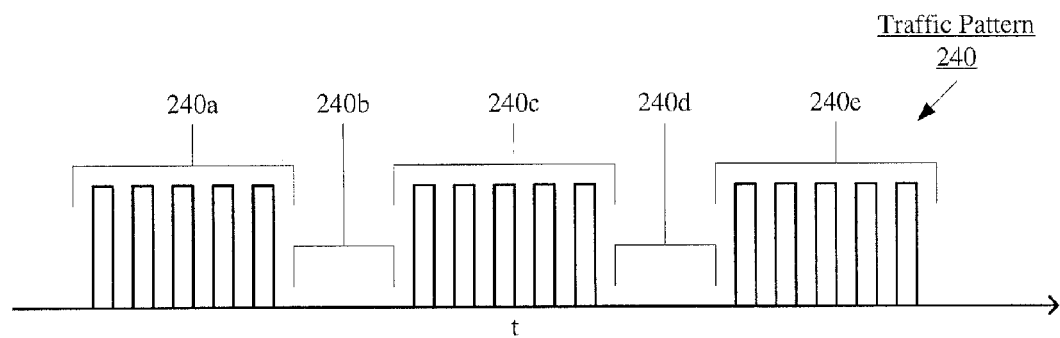
FIGS. 2C-E show exemplary traffic patterns from executing the application.
Figure 2D:
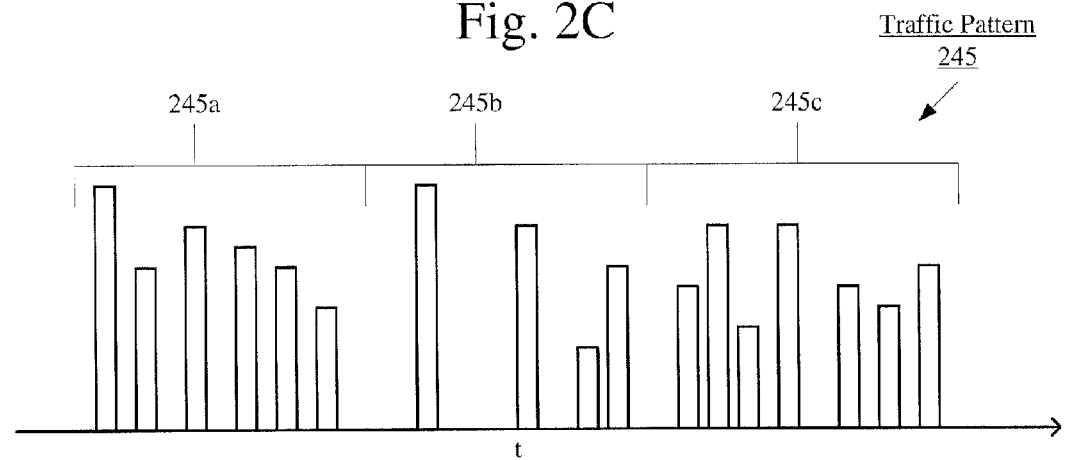
Figure 2E:
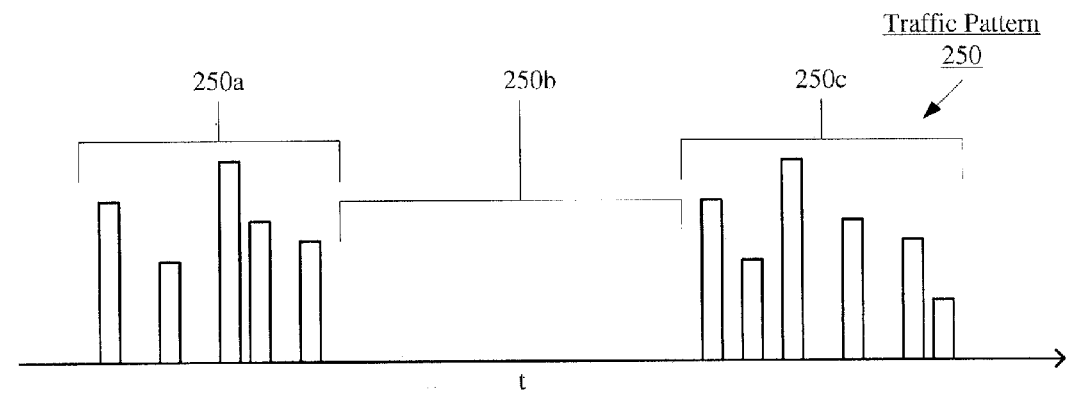

FIGS. 2C-E show exemplary traffic patterns 240, 245, 250 from executing an application. The traffic pattern 240 of FIG. 2C may represent a manner in which voice data is transmitted such as with VoLTE. The traffic pattern 245 of FIG. 2D may represent a manner in which video data is transmitted such as streaming video data. The traffic pattern 250 of FIG. 2E may represent a manner in which browsing data is transmitted such as with the browser application.

With the traffic pattern 240, a known pattern may emerge for a voice related application. Specifically, a set of subframes may be when a voice spurt exists followed by a set of subframes when there is a silence period and repeating. That is, the application traffic is bursty in which there are periods of activity followed by periods of inactivity. For example, the voice data may be received from a user who speaks, pauses to hear what the other user has to say, and responds. As illustrated, a plurality of sections 240a-e may exist in which the sections 240a, 240c, 240e relate to a voice spurt being received and sections 240b, 240d relate to a silence period. The voice packets may also be of a fixed size as well as having a fixed inter-arrival time within a talk-spurt.

With the traffic pattern 245, a known pattern may also emerge for a video related application. Specifically, the set of subframes for the traffic pattern 245 may continuously exist. That is, the application traffic may include no silence periods or a silence period that is of sufficient duration. For example, the video data is being streamed throughout the duration of the video file for the user to view. As illustrated, a plurality of sections 245a-c may exist in which all these sections have video data being constantly downlinked. The video packets are shown to be of variable size and having a variable inter-arrival time within the video frame.

With the traffic pattern 250, a known pattern may also emerge for a browser related application. Specifically, a set of subframes may be when a packet session is requested followed by an extended set of subframes when there is no transmission activity. That is, the application traffic is bursty in which there are periods of activity followed by a longer period of inactivity. For example, the browser data may be received that allows the user to view this data and further browser data may subsequently be received. As illustrated, a plurality of sections 250a-c may exist in which sections 250a, 250c relate to the browser data being received and section 250b relates to a silence or reading period. The browser packets may be of variable size with variable inter-arrival time.

According to the exemplary embodiments, the downlink scheduling of the PDSCH for a given station may be based upon the activity patterns. After a period of inactivity, on reception of the first PDSCH for downlink data, there is a high probability of receiving a further PDSCH in subsequent subframes since the activity period has started. In such scenarios, it is more desirable to maintain the decode performance optimum by performing the channel estimation continuously even though there may be occasional subframes in the middle that have no PDSCH scheduled for the station 100. For example, the packet inter-arrival time within the activity period may be less than the duration of a subframe (e.g., 1 ms). In another example, the scheduler of the network (e.g., an Evolved Node B (eNB) of the LTE network) may schedule other stations as well in the system and may defer scheduling for a time duration (e.g., a few ms) in the presence of congestion. Therefore, the processor 105 may be configured to dynamically toggle between a full channel estimation when required in which all received reference symbols (or a predetermined number of received reference symbols) are used in channel estimation to maximize accuracy thereof and a partial channel estimation when allowed in which a subset of the received reference symbols are used in channel estimation to conserve power. Specifically, when it is determined that no further activity is happening on the downlink, then partial channel estimation may be enabled whereas on detecting that the activity is starting, full channel estimation may be enabled.

Figure 3:
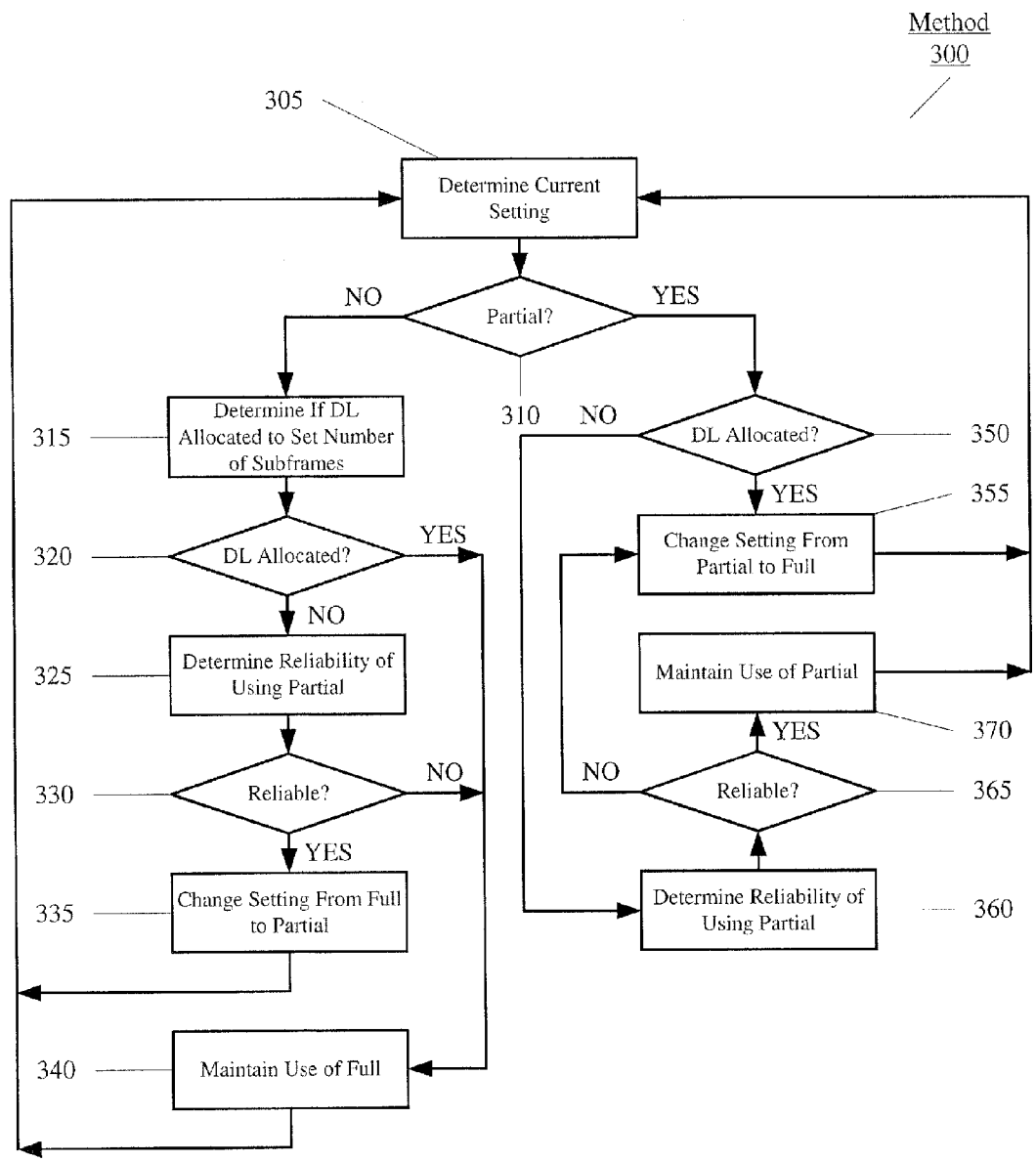
FIG. 3 shows an exemplary method for determining a setting for channel estimation.

FIG. 3 shows an exemplary method for determining a setting for channel estimation. Specifically, the exemplary method 300 relates to dynamically switching between a full channel estimation setting and a partial channel estimation setting. The method 300 will be described with regard to the station 100 of FIG. 1, the subframe 200 of FIG. 2A, the traffic activity 215 of FIG. 2B, and the traffic patterns 240-250 of FIGS. 2C-E.

In step 305, the processor 105 determines the current setting for channel estimation. Specifically, the PDCCH monitoring state may be reset at initialization. The channel estimation setting may be set to full or partial at initialization. The initial setting may me determined by the user or may be preprogrammed in the channel estimation application. In step 310, a determination is made whether the current setting is for partial channel estimation. If the current setting is for full channel estimation, the method 300 continues to step 315.

In step 315, the processor 105 determines whether a downlink has been allocated for a predetermined number of subframes prior to the current subframe. The PDCCH allocation may be monitored for dedicated channels (e.g., cellular radio network temporary identities (C-RNTI)) every OFDM symbol of each subframe. The predetermined number of subframes may be set to a variety of different numbers. The predetermined number of subframes may be a minimum that satisfies a condition to change a setting to partial channel estimation. For example, the predetermined number of subframes may be a number of subframes for a maximum round trip delay in the network in case of transmission control protocol (TCP) traffic. This may guarantee that a requisite time has elapsed for the last packet of a session to be received. In another example, the predetermined number of subframes may be selected such that a certain percentile of inter-arrival time between packets within a packet session (e.g., bursts of activity) is guaranteed to fall below a corresponding time duration of the predetermined number of packets.

In step 320, a determination is made whether at least one of the predetermined number of subframes prior to the current subframe has a downlink allocated thereto. If a downlink has been allocated to one of these subframes, the method 300 continues to step 340. In step 340, the full channel estimation setting is maintained. However, if no downlink is allocated to any of the predetermined number of subframes prior to the current subframe, the method 300 continues to step 325.

In step 325, the processor 105 determines a reliability value as to whether the partial channel estimation setting may be used. For example, it may be determined that the PDCCH may not be received reliably in the manner specified with partial channel estimation. The processor 105 may calculate using the various wireless parameters to determine this reliability value. The downlink radio frequency conditions may also include a receive signal quality that is sufficient to receive the PDCCH (or physical hybrid ARQ indicator channel (PHICH)) channel reliably such as physical layer measures including receiving signal to noise ratio, receiving signal strength/signal quality, a channel quality indicator/rank, etc.

In step 330, a determination is made whether the reliability value indicates that the PDCCH may still be received properly for channel estimation to be performed. If partial channel estimation is unreliable, the method 300 continues to step 340 in which the full channel estimation setting is maintained. However, if the partial channel estimation is determined to be reliable, the method 300 continues to step 335.

In step 335, the processor 105 switches from the full channel estimation setting to the partial channel estimation setting. Accordingly, the conditions that must be satisfied to toggle from the full channel estimation setting to the partial channel estimation setting include no downlink allocation in the predetermined number of frames and the reliability of the partial channel estimation satisfying the respective criteria. With the partial channel estimation setting, the processor 105 may use select reference symbols that are received to perform the channel estimation calculation. That is, only a subset that is less than the total number of received reference symbols are used for the channel estimation calculation. After step 335, the method 300 returns to step 305 to dynamically toggle the channel estimation setting during the course of the application being executed.

Returning to step 310, if the processor 105 determines that the setting for channel estimation is set to partial, the method 300 continues to step 350. In step 350, the processor 105 determines whether a downlink has been allocated to a current subframe. If the current subframe has a downlink allocated thereto, the method 300 continues to step 355. In step 355, the processor 105 toggles from the partial channel estimation setting to the full channel estimation setting.

If the current subframe does not have a downlink allocated thereto, the method 300 continues to step 360. In step 360, a determination is made whether the reliability value indicates that the PDCCH may still be received properly for channel estimation to be performed. If partial channel estimation is unreliable, the method 300 continues to step 355 in which the processor 105 toggles from the partial channel estimation setting to the full channel estimation setting. However, if the partial channel estimation is determined to be reliable, the method 300 continues to step 370. In step 370, the partial channel estimation setting is maintained. Accordingly, the condition that must be satisfied to toggle from the partial channel estimation setting to the full channel estimation setting includes either a downlink being allocated to the current subframe or the reliability of the partial channel estimation not satisfying the respective criteria.

The exemplary embodiments provide a system and method of providing a manner of switching between a partial channel estimation setting and a full channel estimation setting and vice versa. The full channel estimation setting may utilize all received reference symbols in order to maximize the accuracy of channel estimation, particularly when the downlink receive performance is required. The partial channel estimation setting may utilize a subset of the reference symbols in order to conserve as much power while still enabling the channel estimation to be performed.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a station:
      determining a setting to perform a channel estimation, the setting being one of a full channel estimation and a partial channel estimation, the full channel estimation including estimating the channel based upon a predetermined number of received reference symbols prior to a current subframe, the partial channel estimation including estimating the channel based upon a subset of the predetermined number of received reference symbols;
      changing the setting from the full channel estimation to the partial channel estimation when a predetermined number of consecutive subframes immediately prior to the current subframe had no downlink allocated thereto and a reliability value indicates that control signals are capable of being received to estimate the channel using the partial channel estimation; and
      changing the setting from the partial channel estimation to the full channel estimation when one of the current subframe had a downlink allocated thereto or the reliability value indicates that the control signals are incapable of being received to estimate the channel using the partial channel estimation.

2. The method of claim 1, further comprising:
   performing a full channel estimation when the setting is a full channel estimation setting; and
   performing a partial channel estimation when the setting is a partial channel estimation setting.

3. A method, comprising:
   at a station:
      determining a channel estimation setting for the station;
      determining, when the channel estimation setting is a full channel estimation setting, whether a downlink has been allocated for a predetermined number of subframes prior to a current subframe, wherein a full channel estimation includes estimating the channel based upon a predetermined number of received reference symbols prior to the current subframe;
      calculating a reliability value for a channel for which channel estimation is to be performed; and
      changing the channel estimation setting to a partial channel estimation setting when no downlink has been allocated for the predetermined number of subframes prior to the current subframe or the reliability value meets a predetermined criteria, wherein partial channel estimation includes estimating the channel based upon a subset of the predetermined number of received reference symbols.

4. The method of claim 3, further comprising:
   performing a partial channel estimation for the channel when the channel estimation setting is set to the partial channel estimation setting.

5. The method of claim 3, further comprising:
   maintaining the channel estimation setting as the full channel estimation setting when the downlink has been allocated for the predetermined number of subframes prior to the current subframe or the reliability value fails to meet the predetermined criteria; and
   performing a full channel estimation for the channel when the channel estimation setting is set to the full channel estimation setting.

6. The method of claim 3, further comprising:
   determining, when the channel estimation setting is a partial channel estimation setting, whether a downlink has been allocated to the current subframe;
   calculating, when the downlink has not been allocated to the current subframe, the reliability value for the channel; and
   maintaining the partial channel estimation setting when the reliability value meets the predetermined criteria.

7. The method of claim 6, further comprising:
   changing the channel estimation setting to a full channel estimation setting when the downlink has been allocated to the immediately prior subframe or the reliability value fails to meet the predetermined criteria.

8. The method of claim 3, further comprising:
   setting the channel estimation setting to a predetermined setting.

9. The method of claim 3, wherein the channel is a Physical Downlink Control Channel (PDCCH).

10. The method of claim 3, wherein the predetermined number of subframes corresponds to a number of subframes for a maximum roundtrip delay in network traffic.

11. The method of claim 3, wherein the predetermined number of subframes corresponds to an inter-arrival time between packets within a packet session.

12. The method of claim 3, wherein the reliability value is calculated based on one of a received signal to noise ratio, a received signal strength/signal quality, a channel quality indicator/rank for the channel.

13. The method of claim 3, wherein the predetermined number of subframes is related to an application being executed by the station.

14. A station, comprising:
   a transceiver configured to establish a connection to a network, the transceiver further configured to receive reference symbols from the network; and
   a processor coupled to a memory, wherein the processor is programmed to determine a channel estimation setting to perform a channel estimation, the setting being one of a full channel estimation and a partial channel estimation, the full channel estimation including estimating the channel based upon a predetermined number of received reference symbols prior to a current subframe, the partial channel estimation including estimating the channel based upon a subset of the predetermined number of received reference symbols, the processor being programmed to:
  determine a current channel estimation setting for the station;
  determine, when the current channel estimation setting is a full channel estimation setting, whether a downlink has been allocated for a predetermined number of subframes prior to a current subframe;
  calculate a reliability value for a channel for which channel estimation is to be performed; and
  change the current channel estimation setting to a partial channel estimation setting when no downlink has been allocated for the predetermined number of subframes prior to the current subframe or the reliability value meets a predetermined criteria.

15. The station of claim 14, wherein the processor is further programmed to:
  perform a partial channel estimation for the channel when the current channel estimation setting is set to the partial channel estimation setting.

16. The station of claim 14, wherein the processor is further programmed to:
  maintain the current channel estimation setting as the full channel estimation setting when the downlink has been allocated for the predetermined number of subframes prior to the current subframe or the reliability value fails to meet the predetermined criteria; and
  perform a full channel estimation for the channel when the current channel estimation setting is set to the full channel estimation setting.

17. The station of claim 14, wherein the processor is further programmed to:
  determine, when the current channel estimation setting is a partial channel estimation setting, whether a downlink has been allocated to the current subframe;
  calculate, when the downlink has not been allocated to the current subframe, the reliability value for the channel; and
  maintain the partial channel estimation setting when the reliability value meets the predetermined criteria.

18. The station of claim 17, wherein the processor is further programmed to:
  change the current channel estimation setting to a full channel estimation setting when the downlink has been allocated to the current subframe or the reliability value fails to meet the predetermined criteria.

19. The station of claim 14, wherein the predetermined number of subframes corresponds to one of (i) a number of subframes for a maximum roundtrip delay in network traffic, (ii) to an inter-arrival time between packets within a packet session, or (iii) an application being executed by the station.

20. The station of claim 14, wherein the reliability value is calculated based on one of a received signal to noise ratio, a received signal strength/signal quality, a channel quality indicator/rank for the channel.

* * * * *